Patented Dec. 11, 1934

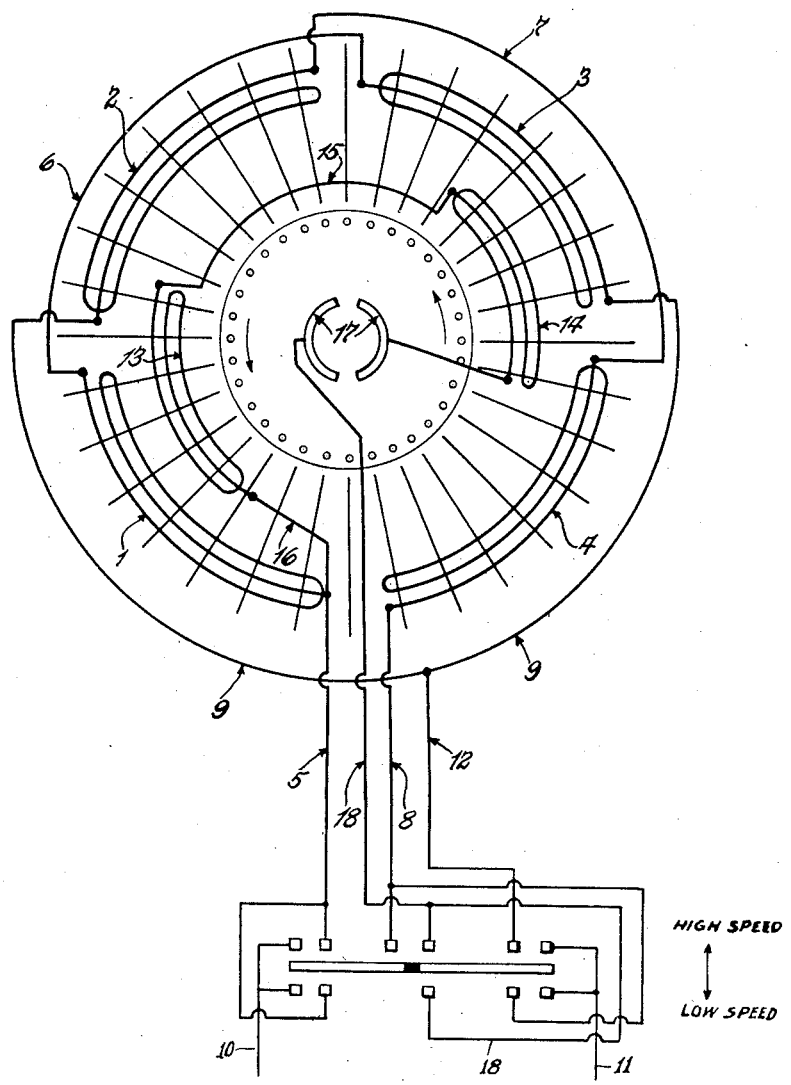

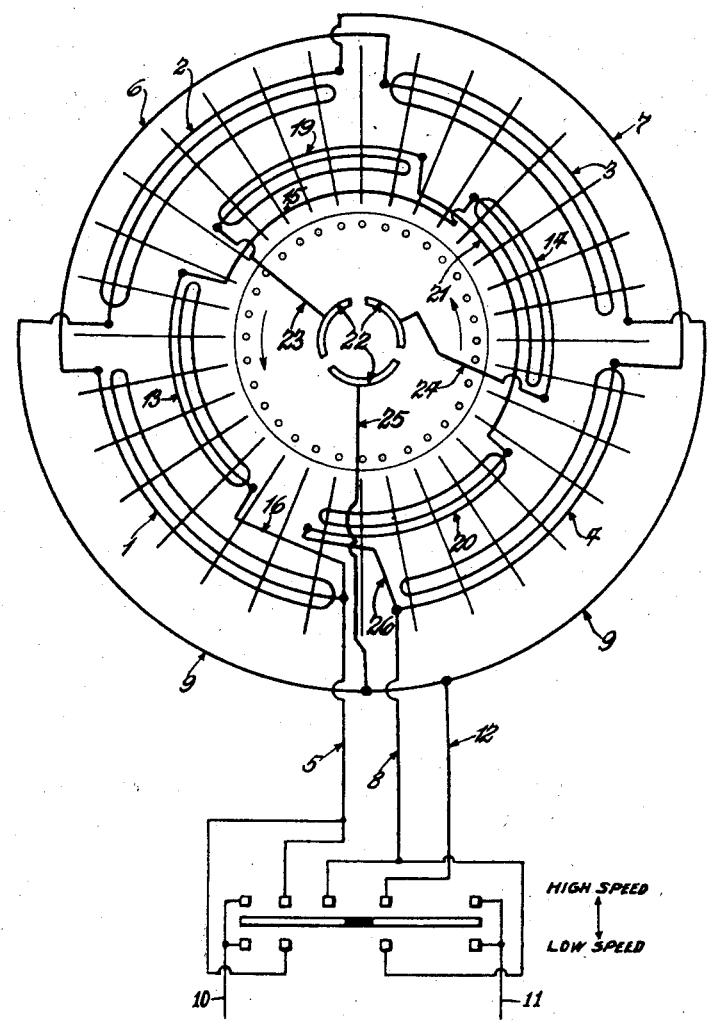

1,983,741

UNITED STATES PATENT OFFICE 1,983,741

MULTISPEED SPLIT PHASE MOTOR

Clinton H. Dederick, St. Louis, Mo., assignor to The Emerson Electric Mfg. Co., St. Louis, Mo., a corporation of Missouri Application June 30, 1930, Serial No. 464,721

6 Claims. (Cl. 172—279)

This invention relates to split phase alternating current induction motors.

An object of this invention is to provide an improved motor of the alternating current split phase type that will have a plurality of synchronous speeds.

Further objects will appear from the following detail description taken in connection with the accompanying drawings, in which:—

Fig. 1 is a diagram of one embodiment of this invention.

Fig. 2 is a diagram of another embodiment of this invention.

In the drawings and description the invention is exemplified in motors having four main windings, but it will be understood that this is merely illustrative as the invention may be embodied in a motor employing any number of main windings.

The motor consists of a frame with a wound field and a squirrel cage induction type armature. Each of the motors illustrated and described has main primary windings of low ohmic resistance and phase displaced auxiliary windings of high ohmic resistance. The main windings are so arranged and connected that for operation on high speed each alternate winding is of like polarity but of opposite polarity from the other windings. For low speed operation the main windings are so connected that all have the same polarity, producing consequent poles between each adjacent winding, and causing the motor to operate as an eight pole machine.

The phase-displaced windings are displaced from the main windings and arranged to give a starting torque for either speed. An automatic cutout mechanism is employed to cut out the phase windings after the motor has reached a definite speed. As the construction and operation of the cutout mechanism are well known, it is unnecessary to describe it in detail.

Main windings 1, 2, 3 and 4 are provided. The winding 1 has a lead 5 for connection to a power line, and is connected by the wire 6 to the winding 3, which is so constructed and connected as to have the same polarity as the winding 1. The windings 2 and 4 are connected by the wire 7 and are so constructed and connected as to have like polarity. A lead 8 is connected to the winding 4 and the wire 9 connects the opposite sides of the windings 2 and 3. Thus, when the connections are made for "low speed", that is when the lead 5 is connected to a line 10 of a power circuit and the lead 8 is connected to the other line 11 of the power circuit, all of the main windings will be connected in circuit and of the same polarity, and the motor will operate as an eight pole machine.

A lead 12 is connected to the wire 9 intermediate the windings 2 and 3. When, therefore, connection is made for "high speed", that is when the leads 5 and 8 are connected to the line 10 and the lead 12 is connected to the line 11, the windings 1 and 3 will be connected in series and of the same polarity and the windings 2 and 4 will be connected in series and of like polarity one with the other, but the windings 2 and 4 will be connected in parallel with the windings 1 and 3 and of opposite polarity with those windings.

In the embodiment illustrated in Fig. 1, auxiliary windings 13 and 14 are phase displaced respectively from main windings 1 and 3 and have the same polar pitch one with the other and approximately the same polar pitch as that of the windings 1 and 3. As specifically illustrated, each of the main windings occupies eight slots and each of the phase windings occupy seven slots of the field iron. The phase-displaced windings are displaced from their respective main windings by approximately 45 electrical degrees instead of the conventional 90 degree displacement; some displacement other than the conventional 90 degrees being necessary in this embodiment in order to produce a starting torque when the main windings are connected for low speed operation. The windings 13 and 14 are connected in series by the wire 15 and are of the same polarity. The winding 13 is connected by the lead 16 to the lead 5 and the winding 14 is adapted to be connected by an automatic cutout 17 to the lead 18. The lead 18 is adapted to be connected for either high or low speed operation to the line 11.

The phase-displaced windings 13 and 14 are of the same polarity as their adjacent main windings 1 and 3, and as above described are connected in parallel with those windings. When the motor is connected for low speed operation the phase windings 13 and 14 are of the same polarity as all of the main windings, but when the motor is connected for high speed operation they are of opposite polarity from the remote main windings. The auxiliary windings are arranged so as to provide a starting torque whether the motor is connected for high speed or low speed operation.

When the phase-displaced windings 5 and 6 are connected as shown in Fig. 1, the direction of rotation will be that shown by the arrows. By reversal of the leads 16 and 18, the starting torque will be produced opposite to that shown by the arrows on both high and low speed. This torque will not be of the same value as that produced in the direction illustrated because of the effect of the voltage induced in the phase-displaced windings by the main windings.

In the embodiment of the invention illustrated in Fig. 2, main windings 1, 2, 3 and 4 with their connections as illustrated in the embodiment shown in Fig. 1, are provided. Phase windings 13 and 14 are also provided. The difference between the embodiment shown in Fig. 2 and that shown in Fig. 1, is that in Fig. 2 a phase winding is provided for each of the main windings and the connections are so arranged that the polarity of each alternate phase winding is changed to correspond with the polarity of its respective main winding when the connections of the main windings are changed.

Auxiliary winding 19 is phase displaced from main winding 2 and auxiliary winding 20 is phase displaced from main winding 4. A lead 16 is connected to the lead 5 and to the auxiliary winding 13 as provided in the other embodiment, and the windings 13 and 14 are connected by the wire 15 as in the other embodiment. The windings 19 and 20 are connected in series by the wire 21 and are so arranged and connected as to be of the same polarity. The series of windings 19 and 20 are arranged as to be selectively connected in parallel but of opposite polarity with the series of windings 13 and 14, or to be connected in series with the windings 13 and 14 and of like polarity by means presently described.

A three segment automatic cutout 22 is provided in this embodiment. The construction and operation of this cutout is the same as that of the conventional two way cutout with the exception that the contact plates are of three segments spaced 120° apart instead of two segments spaced 180° apart. One of the segments is connected by a lead 23 to the winding 19 opposite from the wire 21; another segment is connected by a lead 24 to the winding 14 opposite the wire 15; and the third segment is connected by a lead 25 to the wire 9, and hence to the lead 12. The winding 20 is connected on the side opposite the wire 21 by a conductor 26 to the lead 8.

The connections for high speed operation, as in the other embodiment, are such that the leads 5 and 8 are connected to the line 10 and the lead 12 is connected to the line 11. The lead 16 being connected to the lead 5, is connected to the line 10. The leads 23 and 24 are connected through the cut-out 22, the lead 25, and lead 12 to the line 11. With the connections so made, each of the auxiliary windings is of the same polarity as its adjacent main winding; each alternate auxiliary winding is connected in series and of like polarity but of opposite polarity from the other auxiliary windings.

For low speed operation the main windings are connected in the same manner as in the other embodiment shown in Fig. 1. The auxiliary windings are connected in such a manner that each has the same polarity as its adjacent main winding and in fact all of the main windings and all of the auxiliary windings are of the same polarity. The lead 16 is connected through the lead 5 to the line 10, and the lead 26 is connected through the lead 8 to the line 11. The leads 23 and 24 are connected through the cutout 22. By this connection all of the auxiliary windings are in series one with the other and in parallel with the main windings which are all in series one with the other.

Inasmuch as the phase-displaced windings 13, 19, 14 and 20 have a high ohmic resistance, and the main windings 1, 2, 3 and 4 have a low ohmic resistance, the current in the phase windings will lead the current in the main windings. The torque produced by the cooperation of the two windings will be in the direction of the arrows as shown in the drawing. By reversal of leads 16 and 24 and of leads 23 and 26, torques will be produced in the direction opposite to that illustrated by the arrows, but will not be of the same value as that in the direction illustrated because of the voltage induced in the phase windings by the main windings.

It will be obvious from the description that this invention provides an alternating current induction motor which may be provided with outside switch connections so that the motor will have two possible synchronous speeds, and will at the same time have phase windings which will be effective to produce a starting torque whether the main windings are connected for low speed or high speed operation.

It will also be obvious that various changes may be made in the details of construction within the scope of the appended claims without departing from the spirit of this invention.

I claim:

1. An induction motor having a set of main windings on the primary, a second set of main windings alternating in position with said first set of windings, means for selectively changing the polarity of each of said second set of main windings, a series of auxiliary windings each phase displaced from a main winding in said first set and a second series of auxiliary windings each phase displaced from a main winding in said second set, and means for changing the polarity of the phase windings in said second series comprising an automatic cutout having three complementary segments, one of said segments being connected to a lead of said first series, another of said segments being connected to a lead of the second series, whereby when said segments are closed the two series of auxiliary windings may be connected in series with each other and of the same polarity, the third segment being connected to a lead to form a shunt whereby when connected to the line and the segments are closed the two series of auxiliary windings may be connected in parallel and of opposite polarity.

2. A split phase induction motor having two circuits each including a main winding, means for selectively connecting said circuits with a power circuit to change the relative polarity of said windings, in combination with two starting circuits each including a starting winding, two leads each connected to a starting circuit and to said means, an automatic cut-out having three complementary segments, leads connecting two of said segments respectively to said starting circuits opposite the first mentioned leads, and a lead connected to the third segment and to said means whereby the said means may selectively reverse the relative polarity of the starting circuits simultaneously with the reversal of the relative polarity in the main winding circuits, and the automatic cut-out will be effective to cut-out the starting circuits in either of said relationships.

3. In a split phase induction motor the combination including two starting winding circuits, leads connected respectively to said circuits and adapted to be connected to a power circuit, an automatic cut-out having three complementary segments, leads connecting two of said segments respectively to said circuits opposite the first mentioned leads, and a lead connected to the third segment and adapted to be connected to the power circuit, whereby the cut-out will be effective to disconnect the winding circuits in different relationships in which the said power circuit leads may be connected to the power circuit.

4. A split phase induction motor having two circuits each including a main winding, two starting circuits each including a starting winding displaced from one of the main windings, an automatic cut-out having three complementary segments, leads connecting two of said segments respectively to said starting circuits, and leads respectively connected to said main winding circuits and to said starting circuits opposite the before mentioned leads and to the third segment and associated with unitary means for selectively connecting the same to a power circuit in either of two relationships to produce either of two speed characteristics in the motor.

5. A split phase induction motor having main windings on the primary, auxiliary starting windings each displaced from a main winding, leads for said main windings and said auxiliary windings to connect the same to a power circuit, means for changing the connection of the leads to the power circuit to reverse the polarity of some of the main windings and some of the auxiliary windings to change the speed characteristics of the motor, the arrangement of said means and said leads being such that the starting windings for each speed characteristic are conductively connected to the power circuit, and an automatic cut-out adapted to disconnect all of said starting windings from the power circuit when connected for either speed characteristic after the motor has attained a predetermined speed.

6. A split phase induction motor having main windings on the primary, a phase displaced auxiliary winding adjacent each main winding, leads for said main windings and said auxiliary windings to connect the same to a power circuit, means for changing the connection of the leads to the power circuit whereby the polarity of each alternate main winding and its corresponding phase winding may selectively be reversed to change the speed characteristic of the motor, the arrangement of said means and said leads being such that the auxiliary windings for each speed characteristic are conductively connected to the power circuit, and an automatic cut-out adapted to disconnect all of said auxiliary windings from the power circuit when connected for either speed characteristic after the motor has attained a predetermined speed.

CLINTON H. DEDERICK.